United States Patent [19]

Tsunekane

[11] Patent Number: 5,870,415
[45] Date of Patent: Feb. 9, 1999

[54] LASERS

[75] Inventor: Masaki Tsunekane, Yamagata, Japan

[73] Assignee: Biophotonics Information Laboratories Ltd., Yamagata, Japan

[21] Appl. No.: 868,586

[22] Filed: Jun. 4, 1997

[30] Foreign Application Priority Data

Jun. 10, 1996 [JP] Japan .................................... 8-147342
Jun. 12, 1996 [JP] Japan .................................... 8-151083

[51] Int. Cl.$^6$ ........................................................ H01S 3/10
[52] U.S. Cl. ................................. 372/22; 372/19; 372/92
[58] Field of Search ................................ 372/22, 19, 92, 372/23, 27, 28

[56] References Cited

U.S. PATENT DOCUMENTS 5,446,749  8/1995  Nighan, Jr. et al. ........................ 372/22
5,638,388  6/1997  Nighan, Jr. et al. ........................ 372/22

OTHER PUBLICATIONS

"Stable Intracavity Doubling of Orthogonal Linearly Polarized Modes in Diode–Pumped Nd: YAG Lasers", Oka et al., Oct. 1988, vol. 13, No. 10, Optics Letters.

"Low–Noise Operation of a Diode–Pumped Intracavity–Doubled Nd: YAG Laser Using a Brewster Plate", Nagai et al., Apr. 1992, vol. 28, No. 4, IEEE Journal of Quantum Electronics.

"6W of Stable, 532 nm, TEM$_{00}$ Output at 30% Efficiency from an Intracavity–Doubleed, Diode–Pumped Multiaxial Mode Nd:YVO$_4$ Laser", Nighan, Jr. et al., PD4–1–PD4–5.

Primary Examiner—Leon Scott, Jr.
Attorney, Agent, or Firm—Staas & Halsey

[57] ABSTRACT

A laser device has a laser medium responsive to an excitation light for generating a laser beam consisting of a plurality of longitudinal modes when excited by an energy of the excitation light, two mirrors constituting a laser resonator for forming an optical path of the laser beam passing through said laser medium, and a nonlinear optical element, arranged in the laser resonator, for generating a second harmonic caused by one of the plurality of longitudinal modes constituting the laser beam generated in said laser medium and a sum-frequency caused by two of the plurality of longitudinal modes constituting the laser beam generated in said laser medium. Wavelength and phase of the longitudinal modes constituting the laser beam generated in said laser medium are controlled to a condition that said nonlinear optical element generates the second harmonic and the sum-frequency, including a second harmonic and a sum-frequency, or sum-frequency-to-sum-frequency, which have the same wavelength as one another and phases serving to weaken one another.

13 Claims, 11 Drawing Sheets

LASERS

BACKGROUND OF THE INVENTION

1. Field of the Invention

The present invention relates to an internal resonator type of laser device which generates a second harmonic.

1. Description of the Related Art

In a laser device in which a nonlinear optical crystal is inserted into a laser resonator to generate a second harmonic with a high efficiency, wherein the laser device has a plurality of longitudinal modes, there will be generated a sum-frequency between the longitudinal modes as well as a second harmonic on each of the plurality of longitudinal modes of laser beams. It happens that a generation of the sum-frequency causes strong mode competition noises, called a "green problem", to be generated. It has been desired from various application sides that the "green problem" is solved, and hitherto, there has been proposed several solutions to this problem.

Figure 9:
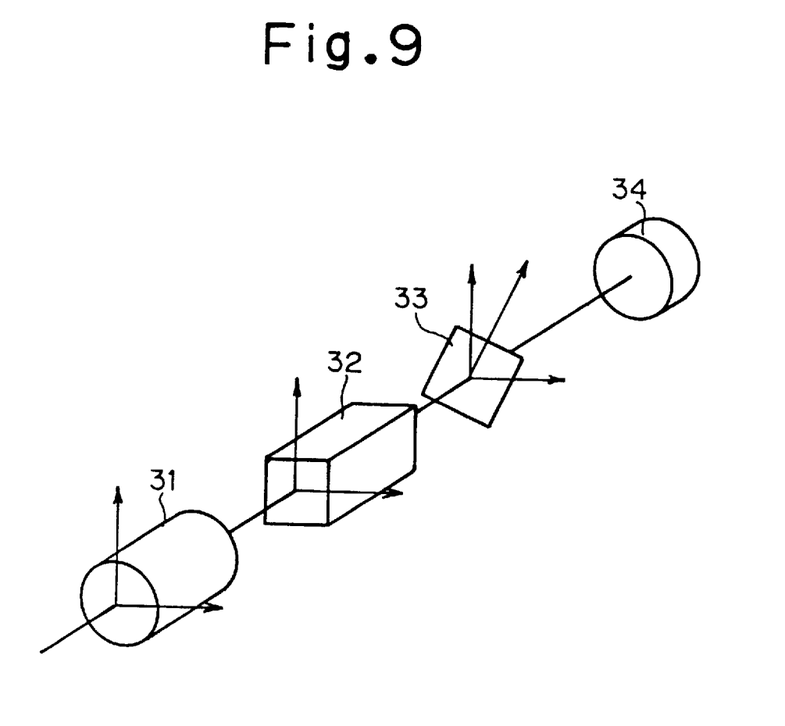
FIG. 9 is an illustration of low-noise operation of a laser according to the earlier technology.

FIG. 9 is an illustration of low-noise operation of a laser according to the earlier technology. Such a laser is equivalent to the internal resonator type of solid state laser device which generates a second harmonic of low noises, as disclosed in the document: Michio Oka and Shigeo Kubota, Optics Letters, Vol. 13, No. 10, P.805 (October 1988).

FIG. 9 shows the configuration of the laser cavity comprising: an Nd:YAG crystal 31 serving as the laser medium; a KTP crystal 32, that is, a Type II phase-matched nonlinear crystal, which generates the second harmonic of the laser beam having the wavelength 1064 nm emitted from the Nd:YAG crystal 31; a quarter-wave plate (QWP) 33 inserted at the laser beam having the wavelength 1064 nm emitted from the Nd:YAG crystal 31, the fast axis of the QWP 33 being arranged with angle 45° with respect to the extraordinary axis of the KTP crystal 32; and an output mirror 34 for outputting the second harmonic generated in the KTP crystal 32, the output mirror 34 constituting a laser resonator.

According to the laser mentioned above, the fast axis of the QWP 33 is arranged with angle 45° with respect to the extraordinary axis of the KTP crystal 32. Thus, the eigen-polarization modes of laser beams in the resonator are controlled to cancel a nonlinear polarization which causes a sum-frequency to be generated in the KTP crystal 32. As a result, there is generated no sum-frequency and thus no noises due to the green problem.

Figure 10:
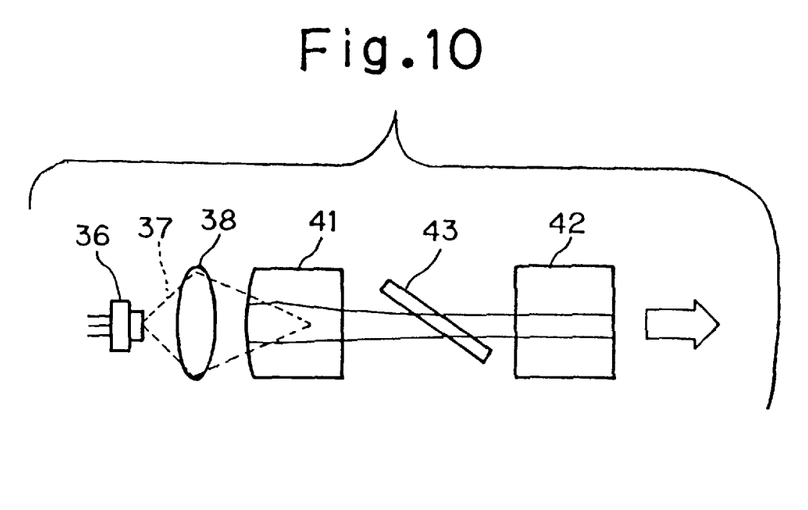
FIG. 10 is an illustration of low-noise operation of a laser according to the earlier technology, which is different in system from that shown in FIG. 9.

FIG. 10 is an illustration of low-noise operation of a laser according to the earlier technology, which is different in system from that shown in FIG. 9. Such a laser is equivalent to the solid state laser device as disclosed in the document: Hideo Nagi, et al, IEEE, Journal of Quantum Electronics, Vol. 28, No. 4, P. 1164 (April 1992).

FIG. 10 shows a laser system comprising: an Nd:YAG crystal 41; a laser diode 36 for emitting excitation light 37; a lens 38 for focusing the excitation light 37 to be introduced into the Nd:YAG crystal 41; a KTP crystal 42, that is, a Type II phase-matched nonlinear crystal, which generates the second harmonic of the laser beam emitted from the Nd:YAG crystal 41; and a Brewster plate 43 arranged in such a manner that the angle between the field direction of polarization, in which the highest transmission is obtained at the plate and that of the extraordinary ray in the KTP crystal 42 is 45°.

According to this laser system, the well known birefringent filter is formed in view of the fact that the KTP crystal 42 has a birefringence property and a transmission of the Brewster plate 43 depends on the direction of polarization, so that the different resonance loss is given on each of the longitudinal modes of the laser beams. Consequently, only a certain one longitudinal mode, which is involved in the lowest loss, is selectively effective for an oscillation. Hence, a sum-frequency is not generated. Thus, it is possible to suppress the noise generation. As a scheme in which a laser is oscillated in a single longitudinal mode, there is also well known one using a ring type resonator.

Figure 11:
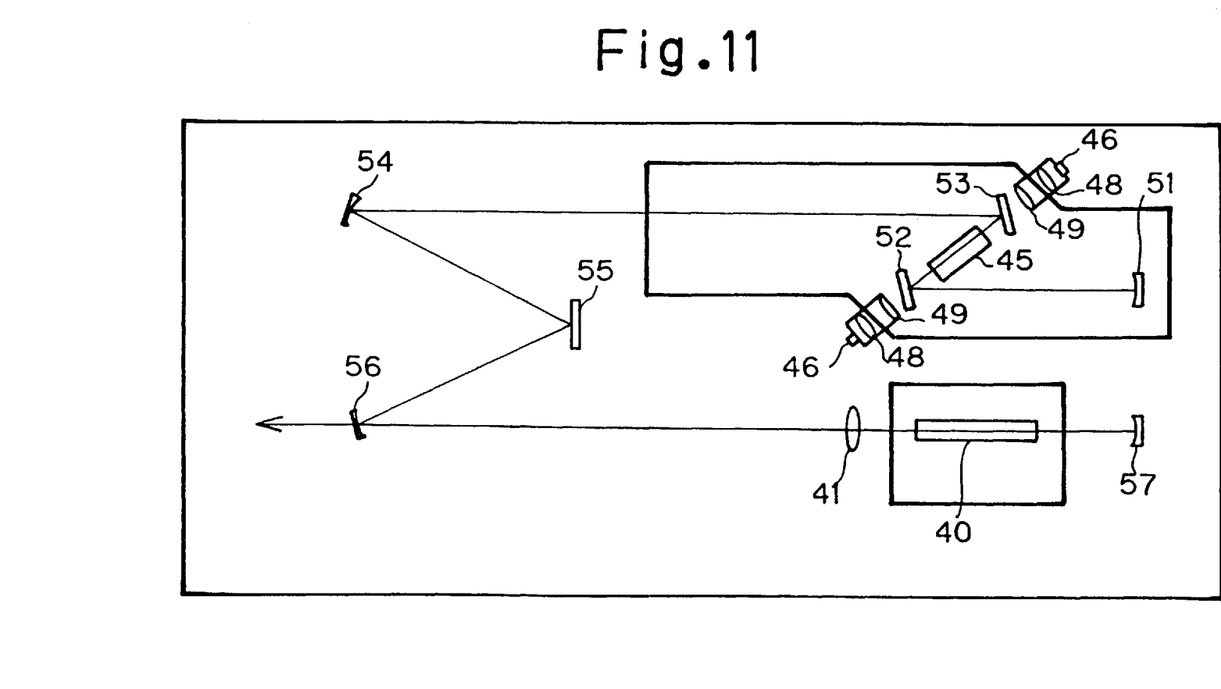
FIG. 11 is an illustration of low-noise operation of a laser according to the earlier technology, which is different in system from that shown in FIGS. 9 and 10.

FIG. 11 is an illustration of low-noise operation of a laser according to the earlier technology, which is different in system from that shown in FIGS. 9 and 10. Such a laser is equivalent to the laser device as disclosed in the document: W. L. Nighan et al, Technical Digest of Advanced Solid State Lasers, Post Deadline PD4 (1996).

FIG. 11 shows a laser system comprising: an Nd:YVO$_4$ crystal 45 which is a laser medium having a wide oscillation wavelength width; a laser resonator constituted of mirrors 51–57; and two excitation optical systems each comprising an optical fiber end 46, a collimating lens 48 and a condenser lens 49. Excitation light emitted from each of the excitation optical systems is fed to the Nd:YVO$_4$ crystal 45 passing through the mirror 52 or 53.

The laser resonator includes: an LBO crystal 40 for generating a second harmonic of the laser beam generated in the Nd:YVO$_4$ crystal 45, the LBO crystal 40 being a non-linear optical crystal; and a lens 41 for controlling a laser mode of the LBO crystal 40. According to this laser system, the Nd:YVO$_4$ crystal 45, which is a laser medium having a wide oscillation wavelength width, is used and the laser resonator is extent up to about 1 m by means of doubling the light path using the mirrors 54, 55 and 56, so that a number of longitudinal modes of the laser oscillation light is increased to about 100 axial modes. Thus, a fluctuation of the longitudinal mode output, which is caused by the green problem of the second harmonic generated in the LBO crystal 40, is decreased by mutual cancellation of fluctuations of outputs of a large number of longitudinal modes. Consequently, it is possible to apparently reduce the noises on the overall output of the laser system.

However, according to the scheme shown in FIG. 9 in which quarter-wave plate is inserted, it is needed that two orthogonal polarization modes are oscillated in the associated single longitudinal axial modes, respectively. And a tolerance as to a reflecting power of the coating of the respective crystals and an alignment angle of the mirrors is narrow. Further, in order to maintain the noise-less state for a long time, there is a need to perform a temperature control for the respective parts and the resonator in its entirety with great accuracy.

Also in the scheme shown in FIG. 10 in which the Brewster plate is disposed, in order to stably maintain a single longitudinal mode, there is a need to control a temperature of the KTP crystal and a resonator length with great accuracy. Further, in the event that it is desired to obtain a high output power over 1 w, a high gain of laser medium is required. This makes it easy to bring about a plurality of longitudinal modes on the laser beam. The plurality of longitudinal modes causes noises due to the green problem to be generated. Thus, it is feared that an operational stability of the laser is damaged.

According to the laser system shown in FIG. 11, the resonator length is elongated and a number of longitudinal modes is established above 100 axial modes. This causes an oscillating wavelength band to expand. Thus, it is feared that the wavelength conversion efficiency is lowered since there is a limit in wavelength tolerance of the phase matching. Further, a distribution of the longitudinal modes is easily influenced by reflection of the optical elements or the like inserted into the resonator, and there is the possibility that the longitudinal modes each associated with mutually different frequencies are oscillated. In this case, it is feared that noises due to the green problem are generated. Furthermore, it is difficult to provide a miniaturization of the device because there is a need to provide a resonator length not less than 1 m. And in addition, the resonator is complicated in structure. Thus, it is feared that the mechanical stability is lowered. It is noted that it is very important for assembling parts into a laser device that an adjustment is easy and a degree of freedom in design is large.

SUMMARY OF THE INVENTION

In view of the foregoing, it is therefore an object of the present invention to provide a laser device capable of suppressing noises thereby obtaining a stable output.

Further it is another object of the present invention to provide a laser device capable of suppressing noises thereby obtaining a stable output and in addition having a large degree of freedom on a design and large tolerance limits thereby being adapted for a miniaturization of the device.

To achieve the above-mentioned objects, according to the present invention, there is provided a first laser device comprising:

a laser medium responsive to an excitation light for generating a laser beam consisting of a plurality of longitudinal modes when excited by an energy of the excitation light;

two mirrors constituting a laser resonator for forming an optical path of the laser beam passing through said laser medium; and a nonlinear optical element, arranged in the laser resonator, for generating a second harmonic caused by one of the plurality of longitudinal modes constituting the laser beam generated in said laser medium and a sum-frequency caused by two of the plurality of longitudinal modes constituting the laser beam generated in said laser medium, wherein wavelength and phase of the longitudinal modes constituting the laser beam generated in said laser medium are controlled to a condition that said nonlinear optical element generates the second harmonic and the sum-frequency, including a second harmonic and a sum-frequency, or sum-frequency-to-sum-frequency, which have the same wavelength as one another and phases serving to weaken one another.

The green problem is caused by a competition of an energy of the original laser beam by the second harmonic and the sum-frequency, when the laser beam emanated in the laser medium is converted into the second harmonic and the sum-frequency. In the event that the second harmonic and the sum-frequency, or sum-frequency-to-sum-frequency, have the same wavelength as one another and phases serving to weaken one another, such a competition of an energy is suppressed and then the green problem is suppressed.

In the first laser device mentioned above, it is preferable that one of said two mirrors reflects the second harmonic and the sum-frequency generated from said nonlinear optical element toward said nonlinear optical element, a reflectivity of said one mirror with respect to the second harmonic and the sum-frequency being controlled to satisfy said condition.

If a reflectivity of said one mirror is too low, then the reflectivity does not meet said green problem free condition. The reflection of the mirror significantly contributes to a suppression of the green problem.

In the first laser device mentioned above, it is preferable that said laser medium is arranged at a position on the optical path defined by said two mirrors, the position being apart from either of said two mirrors by not less than one third of an overall length of the optical path.

If the laser medium is located near the center of the laser resonator, the green problem is suppressed and thus a stable oscillation can be expected. It is considered that such an arrangement may contribute to the suppression of the green problem by the following reason. In case of such an arrangement, an energy of longitudinal modes is distributed in such a manner that an energy of the longitudinal mode of the center is large and an energy of each of the longitudinal modes of both the adjacent sides is about half, and in this case, the energy accumulated in the laser medium is efficiently extracted. Consequently, the phases of the longitudinal modes are stabilized and thus the green problem is suppressed.

In the first laser device mentioned above, it is preferable that an optical element for limiting a number of longitudinal modes of the laser beam is arranged in said laser resonator.

This feature makes it possible to avoid an unevenness of longitudinal mode intervals and to reduce a possibility of occurrence of the green problem.

Further, in the first laser device mentioned above, it is preferable that there is provided such a control that a difference between two longitudinal modes in frequency, which are apart from one another with the largest frequency interval, of the plurality of longitudinal modes constituting the laser beam generated in said laser medium is 1.5 GHz or less.

As will be described latter, it is possible to suppress the green problem generation even if a difference between two longitudinal modes in frequency, which are apart from one another with the largest frequency interval, is more than 1.5 GHz. However, in the event that the difference between two longitudinal modes in frequency, which are apart from one another with the largest frequency interval, is 1.5 GHz or less, almost of all the longitudinal modes included in the laser beam satisfy said condition. As a result, it is possible to stably suppress an occurrence of the green problem.

To achieve the above-mentioned objects, according to the present invention, there is provided a second laser device comprising:

a laser medium responsive to an excitation light for generating a laser beam consisting of a plurality of longitudinal modes when excited by an energy of the excitation light;

a first mirror for reflecting the laser beam, which is generated in said laser medium and emitted toward a direction along a first optical path passing through said laser medium, toward a direction in which the laser beam returns to said laser medium along the first optical path;

a second mirror, disposed on the first optical path at a position interposing said laser medium between said first mirror and said second mirror, for causing the excitation light to transmit to introduce the excitation light into said laser medium, and for reflecting the laser beam emitted from said laser medium toward a direction along a second optical path extending in a direction different from the first optical path;

a third mirror, disposed on the second optical path, for reflecting the laser beam, which is reflected by said second mirror toward a direction along the second optical path, toward a direction along a third optical path extending in a direction different from the second optical path;

a fourth mirror, disposed on the third optical path, for reflecting the laser beam, which is reflected by said third mirror toward a direction along the third optical path, toward a direction in which the laser beam returns along the third optical path to said third mirror; and a nonlinear optical element, arranged on the third optical path formed between said third mirror and said fourth mirror, for generating a second harmonic caused by one of the plurality of longitudinal modes constituting the laser beam generated in said laser medium and a sum-frequency caused by two of the plurality of longitudinal modes constituting the laser beam generated in said laser medium, wherein said third mirror reflects the laser beam generated in said laser medium and transmits the second harmonic and the sum-frequency generated in said nonlinear optical element, and wherein said fourth mirror reflects both the laser beam generated in said laser medium and the second harmonic and the sum-frequency generated in said nonlinear optical element.

Further, to achieve the above-mentioned objects, according to the present invention, there is provided a third laser device, which is modified from the second laser device mentioned above, wherein said laser medium is arranged on the second optical path instead of the first optical path.

According to the second and third laser devices, when a laser mode is controlled, it is possible to move the first mirror in a direction along the first optical path and also to move the fourth mirror in a direction along the third optical path. Consequently, a degree of freedom for the mode control can be enhanced. Hence, in the event that as the third mirror, a concave mirror is used, it is permitted to use a concave mirror having low curvature and to spread an interval between the third mirror and the fourth mirror. Further, changes of the laser performance by change of position of the fourth mirror is small. Therefore, a control for suppressing a green problem generation is easy, and it is excellent in long stability. In this manner, it is possible to substantially enhance a degree of freedom on a design.

Further, according to the second and third laser devices, it is possible to obtain the second harmonic emanated in the nonlinear optical element through the third mirror using as an output mirror.

In the second and third laser devices mentioned above, it is preferable that said third mirror is a concave mirror.

Further, in the second and third laser devices mentioned above, it is preferable that anyone of said first, second and third optical paths is provided with an optical element for limiting a number of longitudinal modes of the laser beam.

A limit of a number of longitudinal modes emanated in the laser medium may reduce an affect by the property that the phase matching condition depends on the wavelength in the nonlinear optical element, so that the transfer conversion efficiency to the second harmonic is improved. In addition, the reduction of a number of longitudinal modes substantially contributes to suppression of the green problem, as described above.

Further, in the second laser device mentioned above, it is preferable that said laser device further comprises a condensing optical element, disposed at a position interposing said second mirror between said laser medium and said condensing optical element, for condensing the excitation light into said laser medium, said condensing optical element being adjustable in its condensing position for the excitation light in a direction along said first optical path. Likewise, in the third laser device mentioned above, it is preferable that said laser device further comprises a condensing optical element, disposed at a position interposing said second mirror between said laser medium and said condensing optical element, for condensing the excitation light into said laser medium, said condensing optical element being adjustable in its condensing position for the excitation light in a direction along said first optical path.

Enabling the condensing position of the excitation light to be controlled makes it possible to provide an optimum regulation for an overlap of the excitation mode and the laser mode. And when a power for the excitation light is increased, a control of the condensing position according to the power makes it possible to extract an laser output in compliance with the power for the excitation light.

DESCRIPTION OF THE PREFERRED EMBODIMENTS

Hereinafter, there will be described embodiments of the present invention.

Figure 1:
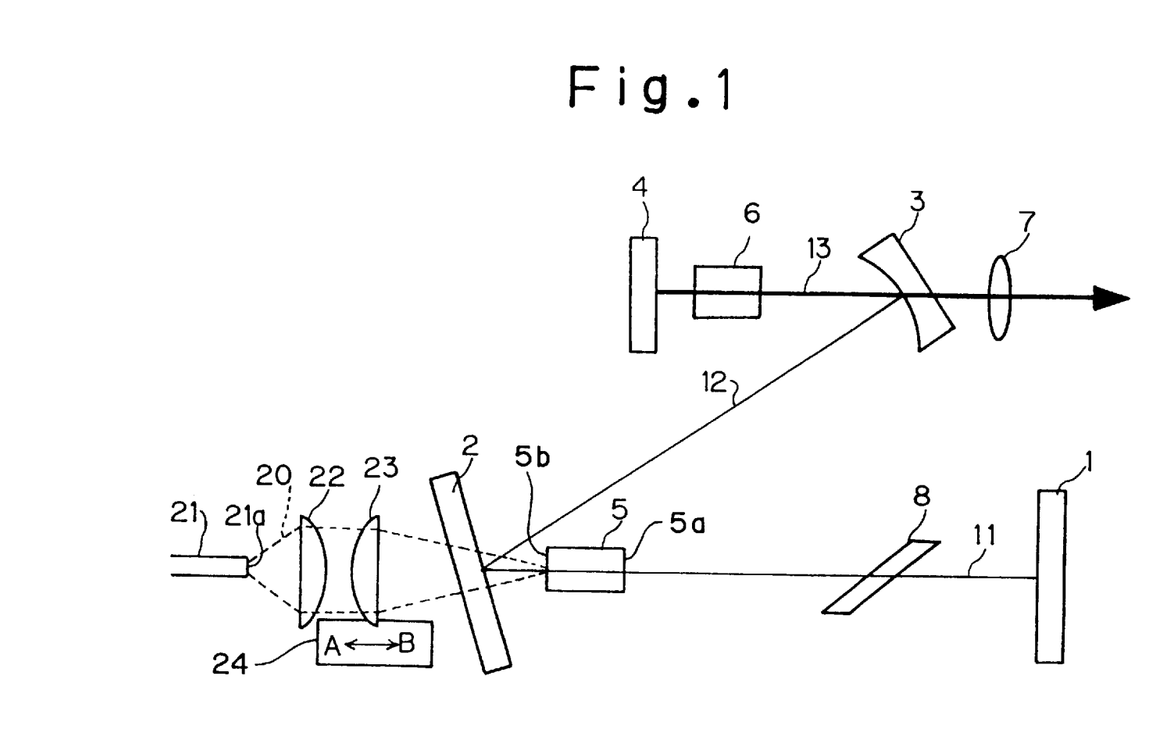
FIG. 1 is a schematic illustration of a laser device according to the first embodiment of the present invention.

FIG. 1 is a schematic illustration of a laser device according to the first embodiment of the present invention.

In FIG. 1, the laser device has a 5 mm diameter and 5 mm long Nd:YAG laser crystal 5 which is one of the laser mediums. The Nd:YAG laser crystal 5 is irradiated with excitation light 20. The excitation light 20 is emitted from the end 21a of an optical fiber 21, collimated by a collimating lens 22, and focused by a condenser lens 23 at the Nd:YAG laser crystal 5 passing through a plane mirror 2 which is an example of a second mirror referred to in the present invention. The condenser lens 23 is fixed on a movable stage 24 which is movable in directions shown with arrows A and B in FIG. 1 so as to control a position of the condenser lens 23.

The plane mirror 2, which is an example of a second mirror referred to in the present invention, has a high reflection factor not less than 99.9% with respect to light of the wavelength 1064 nm of the oscillated laser beam at the Nd:YAG laser crystal 5, and a transmission factor 95% with respect to light of the wavelength 809 nm of the excitation light.

On each of the ends 5a and 5b of the Nd:YAG laser crystal 5, there is formed a dielectric film having a reflection factor not much than 0.1% with respect to the oscillated laser beam (wavelength 1064 nm) and a reflection factor not much than 0.5% with respect to the excitation light (wavelength 809 nm).

Inside the Nd:YAG laser crystal 5, a laser oscillation occurs owing to the energy of the excitation light, so that the above-mentioned wavelength 1064 nm of laser beam is generated. The laser beam thus generated is emitted from the Nd:YAG laser crystal 5 in the direction along a first optical path 11. On the first optical path 11, there is disposed a plane mirror 1 (an example of the first mirror referred to in the present invention) having a reflection factor of 99.9% with respect to the oscillated laser beam (wavelength 1064 nm). According to the present embodiment, the distance between the plane mirror 1 and the plane mirror 2 is 30 cm, and the Nd:YAG laser crystal 5 is placed at the position which is close to the plane mirror 2.

On the first optical path 11, a Brewster plate 8 is also disposed. The Brewster plate 8 is fixed in such a manner that the direction of polarization, in which the highest transmission is obtained, is 45° with respect to the direction of extraordinary axis which is one of the crystal axes of a KTP crystal 6 for generating the second harmonic and the sumfrequency. The KTP crystal 6 will be described latter. In this condition, the highest efficiency of generation of the second harmonic in the KTP crystal 6 is attained, and in addition the most effective wavelength selection operation is performed as the birefringent filter. This feature makes it possible to significantly reduce a number of longitudinal modes on the oscillation spectrum thereby reducing an affect by the property that the phase matching condition depends on the wavelength. Thus, the transfer conversion efficiency to the second harmonic is query further improved. In addition, the reduction of a number of longitudinal modes on the oscillation spectrum may serve to effectively suppress the green problem, as will be described latter.

It is noted that the purpose of the use of the Brewster plate 8 is not to limit the longitudinal modes of the laser beam to one mode, but to suppress generation of the longitudinal modes of the laser beam at positions scattered on the frequency axis.

The laser beam emitted from the Nd:YAG laser crystal to the plane mirror 2 side is reflected in the direction along a second optical path 12 extending in the direction different from that of the first optical path 11. On the second optical path 12, there is disposed a 70 mm curvature radius concave mirror 3 (an example of the third mirror referred to in the present invention) having a high reflection factor not less than 99.9% with respect to light of the wavelength 1064 nm, and a transmission factor 95% with respect to light of the wavelength 532 nm which is the second harmonic of the laser beam of wavelength 1064 nm generated in the KTP crystal 6. The concave mirror 3 serves as an output mirror of the second harmonic. The laser beam, which is reflected by the plane mirror 2, travels along the second optical path 12 and reaches the concave mirror 3. Then the laser beam is reflected by the concave mirror 3 toward the direction along the third optical path 13 extending to the direction different from that of the second optical path 12. According to the present embodiment, the distance between the plane mirror 2 and the concave mirror 3 is 25 cm. On the third optical path 13, there is disposed a plane mirror 4 (an example of the fourth mirror referred to in the present invention) having a high reflection factor not less than 99.9% with respect to light of wavelength 1064 nm and a high reflection factor not less than 99.5% with respect to light of the wavelength 532 nm which is the second harmonic of the laser beam of wavelength 1064 nm. The laser beam, which is reflected by the concave mirror 3 and travels along the third optical path 13, is reflected by the plane mirror 4 in the direction returning to the concave mirror 3 along the third optical path 13. According to the present embodiment, the distance between the concave mirror 3 and the plane mirror 4 is about 4 cm.

On the third optical path 13 between the concave mirror 3 and the plane mirror 4, there is disposed the KTP crystal 6, that is, a Type II phase-matched nonlinear crystal, which generates the second harmonic of wavelength 532 nm upon receipt of light of the wavelength 1064 nm.

On each of the ends of the KTP crystal 6, there is formed a dielectric film having a reflection factor not much than 0.2% with respect to light of wavelength 1064 nm and a reflection factor not much than 0.4% with respect to light of wavelength 532 nm. The KTP crystal 6a is disposed in such a manner that the direction of its extraordinary axis is 45° with respect to the direction of polarization, in which the highest transmission is obtained on the Brewster plate 8. In this manner, it is so arranged that the maximum transfer efficiency to the second harmonic can be attained. Of the second harmonics of wavelength 532 nm emitted from both the ends of the KTP crystal 6 in the opposite directions, light beam directed to the plane mirror 4 is reflected by the plane mirror 4 so as to be directed to the same direction as the another light beam emitted from the KTP crystal 6. Thus, the combined light beams are extracted from the concave mirror 3 out of the resonator. A lens 7 serves to collimate light of wavelength 532 nm.

In case of the laser device shown in FIG. 1, it is permitted to control a distance between the plane mirror 1 and the plane mirror 2 by means of moving the plane mirror 1 in the direction to which the first optical path 11 extends, and also permitted to control a distance between the concave mirror 3 and the plane mirror 4 by means of moving the plane mirror 4 in the direction to which the third optical path 13 extends. These controls make it possible to maintain a stability of the laser resonator through compensating for a thermal lens effect inside the Nd:YAG crystal 5, and in addition to provide an optimum regulation for an overlap of the excitation mode and the laser mode, thereby enhancing efficiency of the laser oscillation. Further, according to the present embodiment, since there is provided a high degree of freedom in a design of the laser mode on the resonator, it is permitted to reduce the laser mode on the KTP crystal 6 disposed on the third optical path 13, even if the concave mirror 3 is given with a large curvature radius, such as 70 mm. Thus, it is possible to extend the distance between the concave mirror 3 and the plane mirror 4 to about 4 cm, and in addition possible to arrange a long nonlinear optical crystal having a margin, thereby improving efficiency in generation of the second harmonic. Furthermore, according to the present embodiment, there is permitted a wide range of allowance in variation of the distance between the concave mirror 3 and the plane mirror 4, the regulation is easy, and an influence of the output variation due to disturbance is small. Consequently, according to the present embodiment, in any excitation conditions it is possible to obtain the highest efficiency of laser output in the excitation condition, and also possible to obtain a good diffraction limit beam without providing a laser mode controlling pinhole and the like.

As mentioned above, the condenser lens 23 is movable in the arrow A–B directions so that the condenser lens 23 is controlled in its position in such a manner that the laser output power becomes maximum. A control of the position of the condenser lens 23 serves to control a focal length of the thermal lens inside the Nd:YAG crystal 5 and the excitation mode, so that the optimum output characteristic can be obtained in compliance with the laser resonator.

As described above, according to the embodiment shown in FIG. 1, since the controls or regulations are easy and the stability of the laser resonator is maintained, it is possible to easily regulate the laser device into a state in which the green problem is stably suppressed.

It is noted that while the present embodiment shows the laser device wherein the Nd:YAG crystal is used by way of example for the laser medium, it is not necessary that the used laser medium is the Nd:YAG crystal, it is acceptable that the laser medium is an Nd:YVO$_4$ crystal, an Nd:YLF crystal, or any other laser medium. As the excitation light source, for example, a semiconductor laser diode, there is selected an excitation light source which generates excitation light having a suitable wavelength associated with a laser medium to be used.

Further, while the first embodiment shows the laser device wherein the KTP crystal is used as the nonlinear optical material which generates the second harmonic, it is not always needed to use the KTP crystal, and it is acceptable that the nonlinear optical material is a BBO crystal, an LBO crystal or any other nonlinear optical material.

Figure 2:
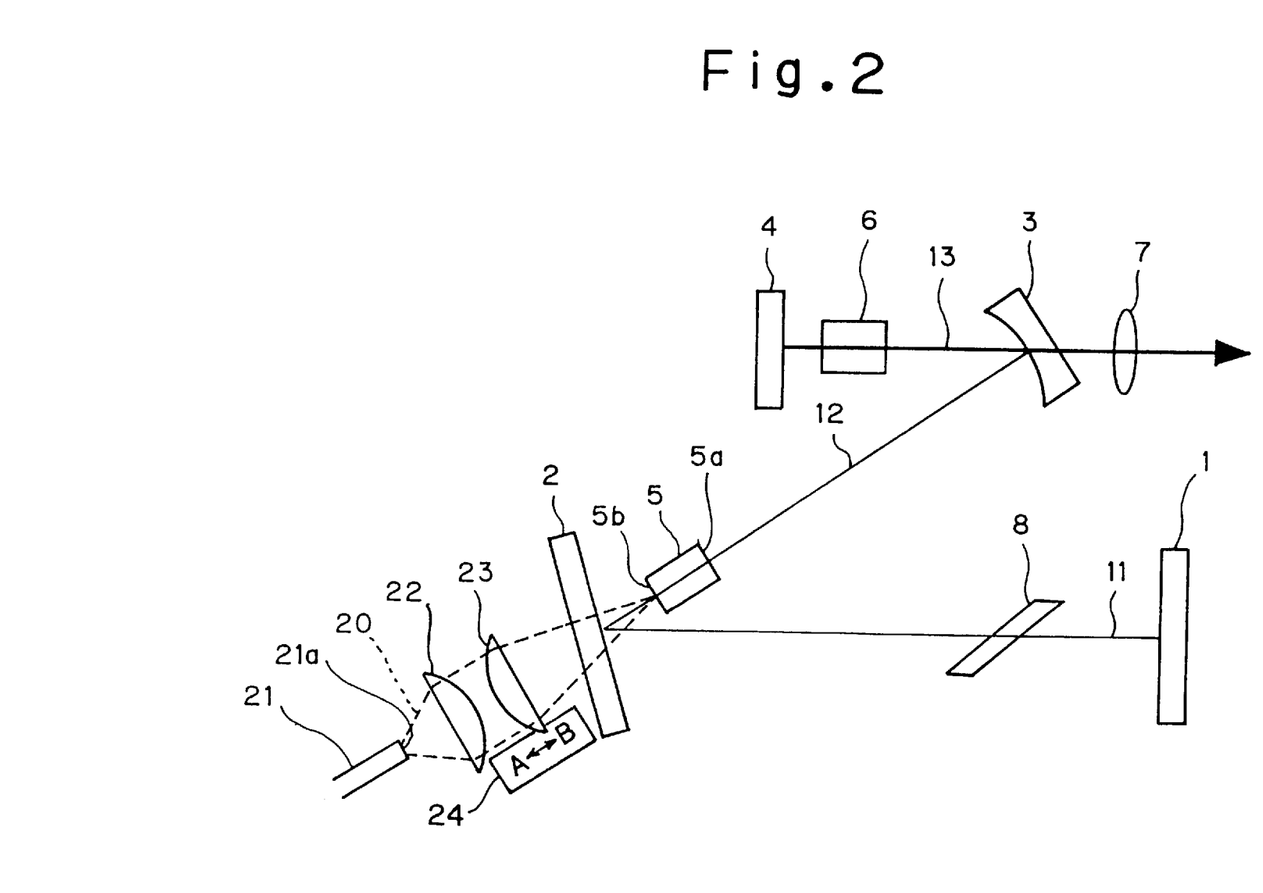
FIG. 2 is a schematic illustration of a laser device according to the second embodiment of the present invention.

FIG. 2 is a schematic illustration of a laser device according to the second embodiment of the present invention.

A difference of the embodiment from the first embodiment resides in the point that the Nd:YAG crystal 5 is placed on the second optical path 12. In this manner, it is acceptable that the laser medium in the present invention is placed on either the first optical path as shown in FIG. 1 or the second optical path as shown in FIG. 2.

Hereinafter, there will be explained as to experimental results, which were measured using the laser device shown in FIG. 1. In the experiments, longitudinal modes and powers of output laser beams changing with time were measured, while a length of the laser resonator or a reflection factor with respect to a specified wavelength of part of the mirrors were varied in the laser device shown in FIG. 1.

Figure 3:
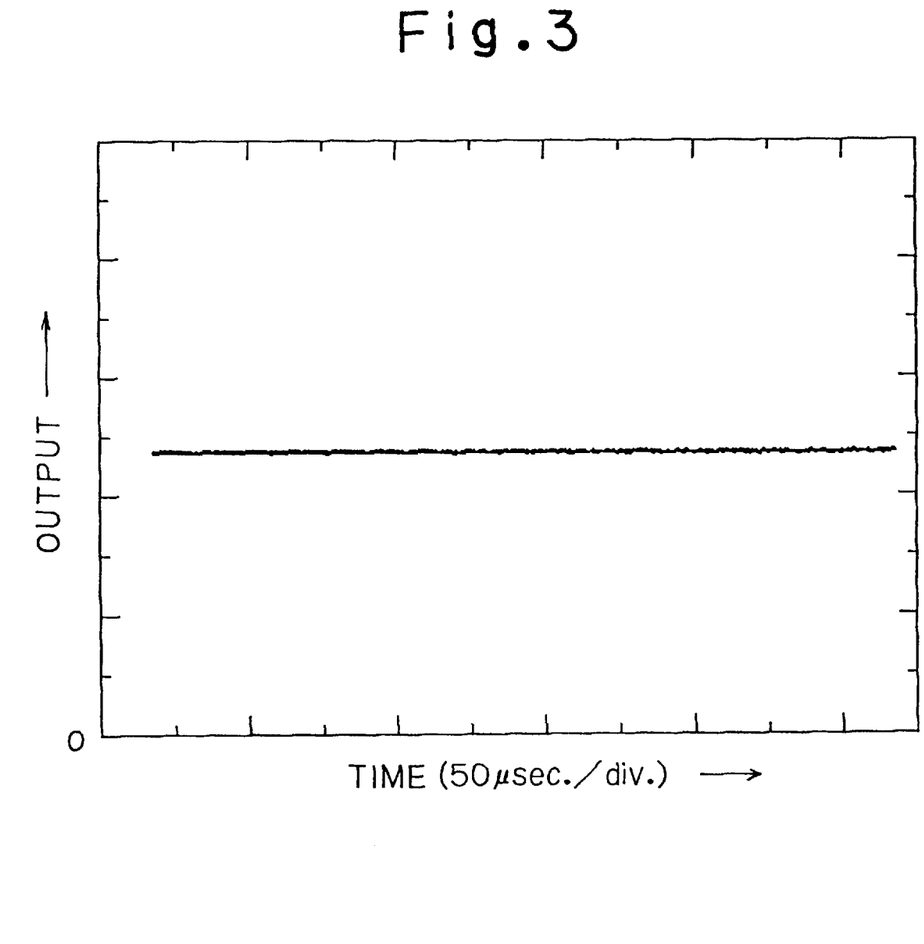
FIG. 3 is a chart showing an green output changing with time when no noise occurs.
Figure 4:
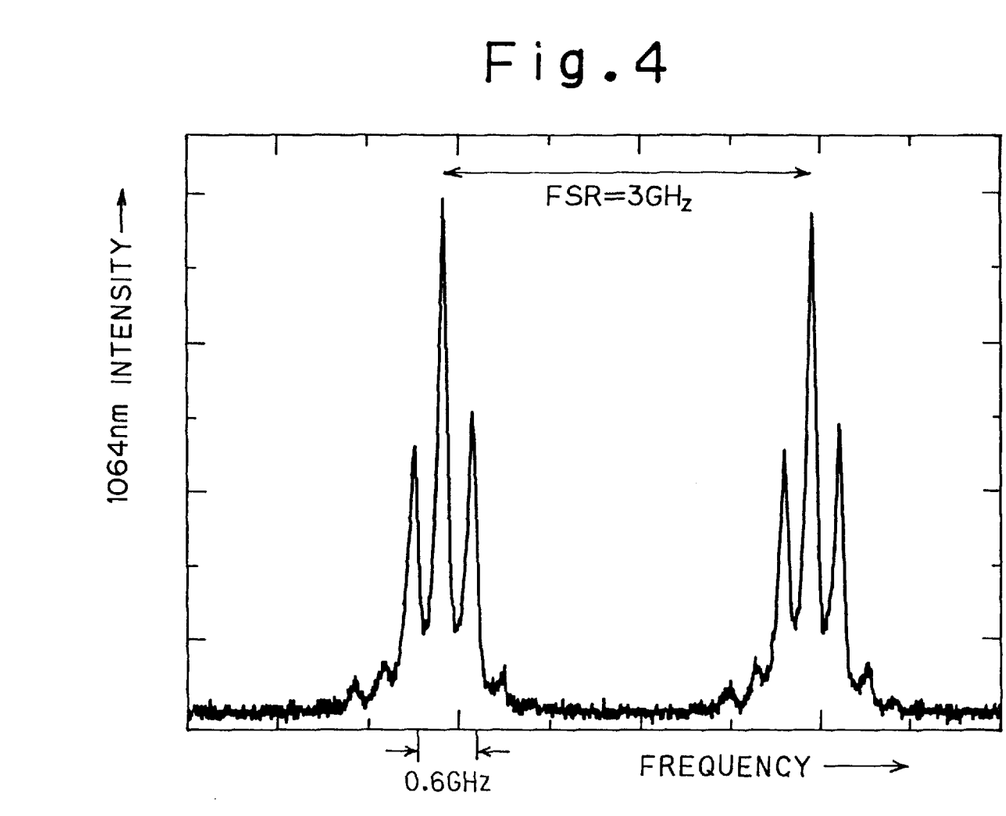
FIG. 4 is a chart showing the measured results of longitudinal mode distribution of the laser oscillation light 1064 nm when no noise occurs.
Figure 5:
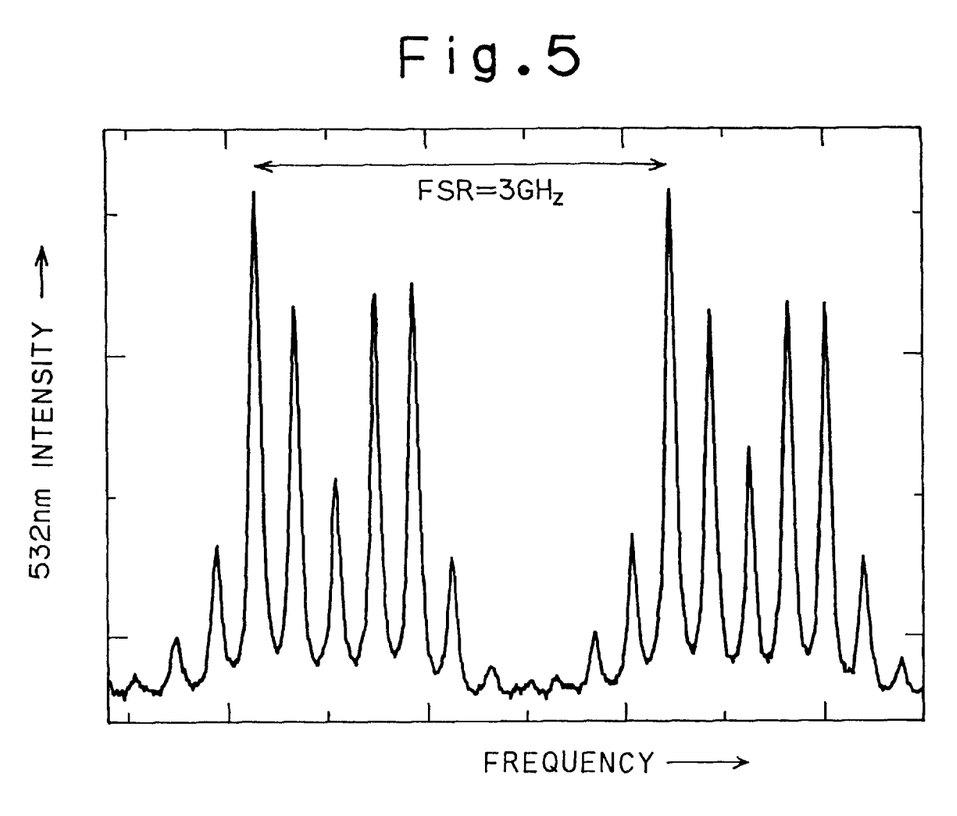
FIG. 5 is a chart showing the measured results of longitudinal mode distribution of the green output 532 nm when no noise occurs.

FIG. 3 is a chart showing an green output (since the second harmonic and the sum-frequency are of green light, the second harmonic and the sum-frequency are generically named "green light" and their output is generically named "green output") in the arrangement shown in FIG. 1. FIG. 4 is a chart showing the measured results of longitudinal mode distribution of the laser oscillation light of wavelength 1064 nm which was little leaked from the laser resonator. FIG. 5 is a chart showing the measured results of longitudinal mode distribution of the green light emitted, which was measured using a Fabry-Perot interferometer. Free spectral range of the interferometer was 3 GHz. Two spectral distributions appearing in FIGS. 4 and 5 are the same spectrum observed in the measurement principle, and thus either one of these spectral distributions will be described hereinafter.

As shown in FIG. 4, a plurality of longitudinal modes of the laser oscillation light were observed on the laser resonator. With respect to the KTP crystal disposed in the laser resonator, as shown in FIG. 5, not only the second harmonics each corresponding to the associated longitudinal mode in FIG. 4 but also generation of the sum-frequencies between the modes were observed. While a number of longitudinal modes was increased, a stable green output was obtained, as shown in FIG. 3, even in the state that the sum-frequencies were generated.

A cause why no noises were generated can be explained through comparing the longitudinal mode distributions of FIGS. 4 and 5 with each other, as follows.

Figure 6:
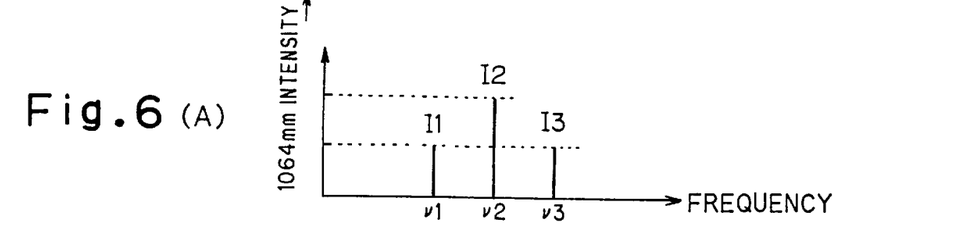
FIGS. 6(A)–6(E) are charts each showing a longitudinal modedistribution of the green output, which is expected when the longitudinal modes of the laser oscillation light are phase-synchronized with one another or not phase-synchronized.

In the longitudinal modes as shown in FIG. 4, it is assumed that intensities of typical three longitudinal modes as shown in FIG. 6(A), that is, longitudinal modes of frequencies ν1,ν2 and ν3 are expressed by I1, I2 and I3, respectively, and the intensity ratio is 1:2:1. Then, the longitudinal mode distribution of each of the second harmonics associated with the respective longitudinal modes is proportional to square of the associated intensity on a theoretical basis, and is given as shown in FIG. 6(B). The sum-frequency between the longitudinal modes is proportional to twice of the intensity product of the associated mode, and is given as shown in FIG. 6(C). Consequently, usually, in the event that the phase relation between the modes is random, the longitudinal mode distribution of the green light obtained is given by a simple sum of the intensity on each of frequencies shown in FIG. 6 (B) and the intensity on each of frequencies shown in FIG. 6 (C). In the event that the frequencies ν1,ν2 and ν3 are longitudinal mode of frequencies which are adjacent to one another at even intervals, the second harmonic 2ν2 of the frequency ν2 and the sum-frequency ν1+ν3 of the frequencies ν1 and ν3 are approximately the same as one another in frequency. Accordingly, when the longitudinal modes of laser oscillation are given with ones shown in FIG. 4, it is expected that, as shown in FIG. 6 (D), the central frequency 2ν2 takes a peak with respect to the mutual intensity distribution of the green light. However, FIG. 5, which shows a distribution of the green light obtained through a measurement, indicates a quite different situation, specifically, the fact that the green light is oppositely weak at the frequency 2ν2. This phenomenon can be explained as follows.

If the second harmonic 2ν2 in FIG. 6 (B) and the sum-frequency ν1+ν3 in FIG. 6 (C) are always shifted in phase by about 180°, the nonlinear polarizations emanated in the KTP crystal are mutually cancelled so that the green light involved in the frequency 2 ν2 is weakened to be obtained. The green problem is caused by a variation in the conversion efficiency of an energy from the original laser beam into the second harmonic and the sum-frequency and a competition for an energy by the second harmonic and the sum-frequency. Consequently, as mentioned above, in the event that the phases between the longitudinal modes serve to cancel and weaken the second harmonic and the sum-frequency, generation of the green problem is suppressed.

It is noted that in the above-mentioned experiments, the respective longitudinal modes were very stable, and thus there was generated no noise due to the competition among the longitudinal modes and a so-called green problem even if any especial fine adjustments of temperature, position and angle of the KTP crystal and an especial fine alignment of the resonator are not performed.

Figure 7A:
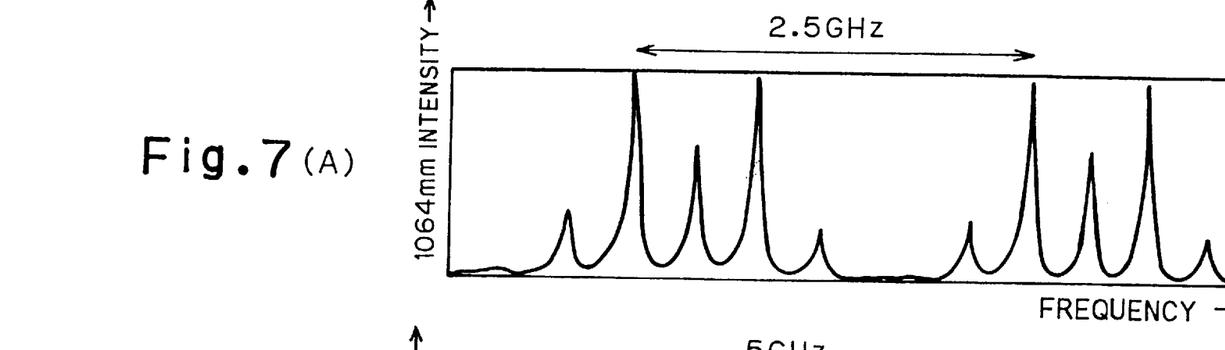
FIGS. 7(A) and 7(B) are charts showing the measured results of longitudinal mode distributions of the laser oscillation light 1064 nm and the green output 532 nm when an interval between plane mirror 1 and plane mirror 2 is shortened to 10 cm, respectively.
Figure 7B:
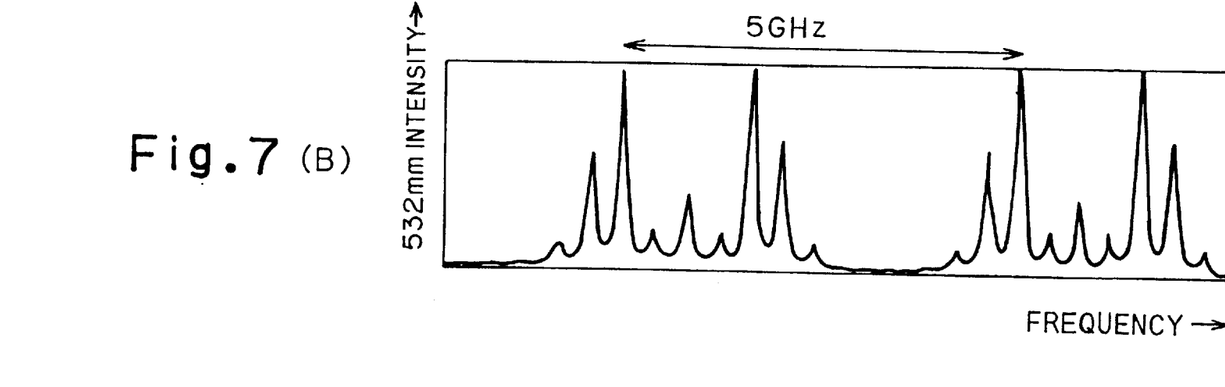

FIGS. 7(A) and 7(B) are charts showing the measured results of longitudinal mode distributions of the laser oscillation light 1064 nm and the green output 532 nm when an interval between plane mirror 1 and plane mirror 2 is shortened to 10 cm, but retaining the states as to other intervals of the mirrors, in the structure of the laser device shown in FIG. 1, respectively. It is noted that FIG. 7(B) shows the measured result of the longitudinal mode distribution of the green light emitted, which was measured using a Fabry-Perot interferometer.

As the distance between plane mirror 1 and plane mirror 2 was shortened, the intervals of the longitudinal modes of the laser oscillation light were spread, a number of longitudinal modes increased to 5 modes, and the relative intensity distribution was varied. This reflects that the length of the laser resonator was shortened to expand the longitudinal mode intervals of the laser oscillation, and because the relative position of the Nd: YAG crystal came near the end of the laser resonator from the center, the distribution efficiency of an extraction for an energy, that is, the efficiency of an extraction of the longitudinal modes of the laser beam for an energy, which was injected into the Nd: YAG crystal and accumulated therein, was varied. Also in this arrangement, as will be seen from FIG. 7(B), the mode of the sum-frequency of the center at which the peak of intensity is expected and the longitudinal modes of the both adjacent sides is weakened, and the phases between the longitudinal modes are always stable, so that a so-called synchronization state has been implemented. Also in this state, no green problem occurs.

Figure 8:
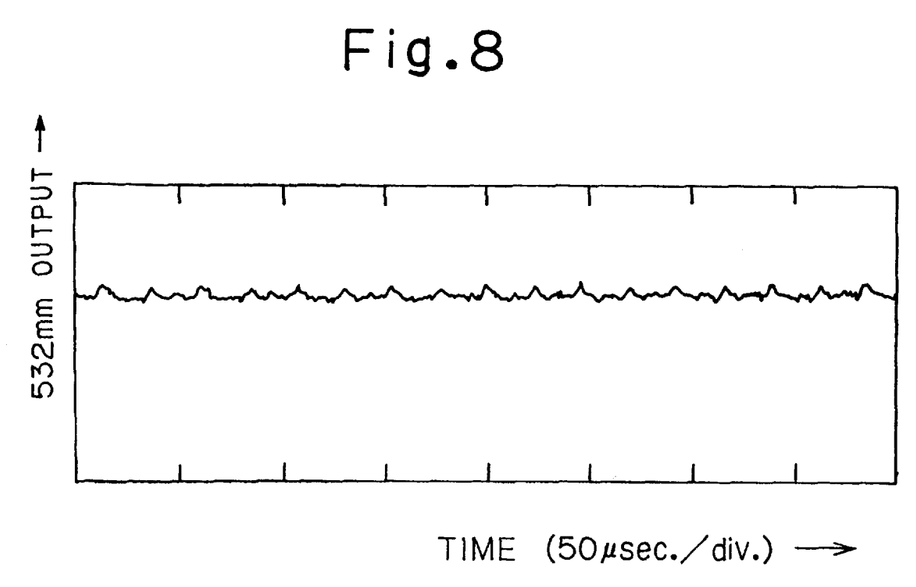
FIG. 8 is a chart showing an green output changing with time, which was measured when an interval between plane mirror 1 and plane mirror 2 was shortened to 10 cm and in addition plane mirror 4 was replaced by one having high transmission with respect to the green light.

FIG. 8 is a chart showing an green output changing with time, which was measured when an interval between plane mirror 1 and plane mirror 2 was shortened to 10 cm and in addition plane mirror 4 was replaced by one having 95% of transmission with respect to the green light. It will be understood that under this condition periodic variations appear on the output and the green problem occurs. From this, it is understood that as an important factor of implementing the above-mentioned mode synchronization, the internal reflection of the green light into the KTP crystal is at work. Specifically, it is considered that when the green light emanated inside the KTP crystal is reflected outside the KTP crystal and again passes through the KTP crystal, the reverse wavelength conversion due to the reversible optical parametric effect occurs, so that the green light is converted to 1064 nm light. Since the thus converted 1064 nm light has the strictly same wavelength as the laser oscillation light, an interference easily occurs. An occurrence of the interference causes the synchronization of the phases of the longitudinal modes to be established or promoted.

Also in the event that the plane mirror 4 was replaced by a plane mirror having a high transmission factor with respect to the green light, there was not generated noises due to the green problem, if the interval between the plane mirror 1 and the plane mirror 2 was given with a range of 20 cm to 40 cm. The generation of noises due to the green problem has something to do with the relative position of the laser medium Nd: YAG in the laser resonator. In the event that the position of the laser medium in the laser resonator is apart from either of the plane mirror 1 and the plane mirror 4 by not less than one third of the laser resonator length, an intensity of the longitudinal modes is distributed in such a manner that an intensity of the longitudinal mode of the central frequency is the highest, and the longitudinal modes of the adjacent both side frequencies are of about the half in intensity. The reason why it is to do so is that in such longitudinal mode distribution, spatially, the maximum extraction efficiency is obtained by extracting an energy in such a way that the longitudinal modes of the adjacent both side frequencies divide into two parts the spatial energy distribution of the laser medium, which the longitudinal mode of the central frequency could not extract, and in the event that time integration of the energy extraction is considered, a case where each of the longitudinal modes has a specified phase difference is excellent, as compared with a case where the longitudinal modes are random in phase, in the point that the energy accumulated in the laser medium is efficiently extracted. Accordingly, in such a position relation of the laser medium, it is easy to establish a synchronization of the phase of the longitudinal modes in oscillation, and thus it is possible to suppress a generation of the green problem.

In the event that a mode synchronization state in which no noises are generated is considered, there is a need to provide an interference in such a manner that the polarization components of the KTP crystal each for generating the associated second harmonic and the sum-frequency are mutually weakened. For providing such an interference, it is necessary that the longitudinal modes in laser oscillation are of even intervals on the frequency axis. In the general laser devices, it often happens that the longitudinal modes of the actual oscillation light are not even intervals owing to a so-called Fabry-Perot etalon effect, which will be caused by a residual reflection of the optical parts and the like constituting the device, and a spatial hole burning effect. In the event that the longitudinal modes in oscillation are not even intervals, even if a synchronization of the phases of the longitudinal modes is established, no interference of the longitudinal modes occurs, and thus it happens that there is generated longitudinal modes in which only the second harmonic or only the sum-frequency exists solely. In such a case, there is a possibility that the green problem occurs. Consequently, it is desirable that optical elements for limiting a number of longitudinal modes of the laser beam are arranged in the laser resonator so as to avoid uneven intervals of the longitudinal modes which will be caused by the Fabry-Perot etalon effect and the spatial hole burning effect.

In the arrangement of the laser device shown in FIG. 1, a birefringent filter is formed by the KTP crystal and the Brewster plate to limit a number of longitudinal mode in oscillation to 3 to 5 modes lined at regular intervals.

Further, for establishing the mode synchronization and inducing a strong interference between the second harmonic and the sum-frequency, it is needed to shorten an interval between the longitudinal modes, which are apart from one another with the longest distance, as shorter as possible. According to the present experiment, in the arrangement shown in FIG. 1, the interval between the longitudinal modes of the laser oscillation beam of wavelength 1064 nm, which are apart from one another with the largest interval, is 1.5 GHz or less, and the longitudinal modes in oscillation are few in number.

As explained above, according to the present invention, there is implemented a laser device capable of deriving a stable output suppressing a noise generation.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A laser device comprising:

a laser medium responsive to an excitation light for generating a laser beam consisting of a plurality of longitudinal modes when excited by an energy of the excitation light;

two mirrors constituting a laser resonator for forming an optical path of the laser beam passing through said laser medium; and a nonlinear optical element, arranged in the laser resonator, for generating a second harmonic caused by one of the plurality of longitudinal modes constituting the laser beam generated in said laser medium and a sum-frequency caused by two of the plurality of longitudinal modes constituting the laser beam generated in said laser medium, wherein wavelength and phase of the longitudinal modes constituting the laser beam generated in said laser medium are controlled to a condition that said nonlinear optical element generates the second harmonic and the sum-frequency, including a second harmonic and a sum-frequency, or sum-frequency-to-sum-frequency, which have the same wavelength as one another and phases serving to weaken one another.

2. A laser device according to claim 1, wherein one of said two mirrors reflects the second harmonic and the sum-frequency generated from said nonlinear optical element toward said nonlinear optical element, a reflection factor of said one mirror with respect to the second harmonic and the sum-frequency being controlled to satisfy said condition.

3. A laser device according to claim 1, wherein said laser medium is arranged at a position on the optical path defined by said two mirrors, the position being apart from either of said two mirrors by not less than one third of an overall length of the optical path.

4. A laser device according to claim 1, wherein an optical element for limiting a number of longitudinal modes of the laser beam is arranged in said laser resonator.

5. A laser device according to claim 1, wherein there is provided such a control that a difference between two longitudinal modes in frequency, which are apart from one another with the largest frequency interval, of the plurality of longitudinal modes constituting the laser beam generated in said laser medium is 1.5 GHz or less.

6. A laser device comprising:

a laser medium responsive to an excitation light for generating a laser beam consisting of a plurality of longitudinal modes when excited by an energy of the excitation light;

a first mirror for reflecting the laser beam, which is generated in said laser medium and emitted toward a direction along a first optical path passing through said laser medium, toward a direction in which the laser beam returns to said laser medium along the first optical path;

a second mirror, disposed on the first optical path at a position interposing said laser medium between said first mirror and said second mirror, for causing the excitation light to transmit to introduce the excitation light into said laser medium, and for reflecting the laser beam emitted from said laser medium toward a direction along a second optical path extending in a direction different from the first optical path;

a third mirror, disposed on the second optical path, for reflecting the laser beam, which is reflected by said second mirror toward a direction along the second optical path, toward a direction along a third optical path extending in a direction different from the second optical path;

a fourth mirror, disposed on the third optical path, for reflecting the laser beam, which is reflected by said third mirror toward a direction along the third optical path, toward a direction in which the laser beam returns along the third optical path to said third mirror; and a nonlinear optical element, arranged on the third optical path formed between said third mirror and said fourth mirror, for generating a second harmonic caused by one of the plurality of longitudinal modes constituting the laser beam generated in said laser medium and a sum-frequency caused by two of the plurality of longitudinal modes constituting the laser beam generated in said laser medium, wherein said third mirror reflects the laser beam generated in said laser medium and transmits the second harmonic and the sum-frequency generated in said nonlinear optical element, and wherein said fourth mirror reflects both the Laser beam generated in said laser medium and the second harmonic and the sum-frequency generated in said nonlinear optical element.

7. A laser device according to claim 6, wherein said laser medium is arranged on the second optical path instead of the first optical path.

8. A laser device according to claim 6, wherein anyone of said first, second and third optical paths is provided with an optical element for limiting a number of longitudinal modes of the laser beam.

9. A laser device according to claim 7, wherein anyone of said first, second and third optical paths is provided with an optical element for limiting a number of longitudinal modes of the laser beam.

10. A laser device according to claim 6 further comprising a condensing optical element, disposed at a position interposing said second mirror between said laser medium and said condensing optical element, for condensing the excitation light into said laser medium, said condensing optical element being adjustable in its condensing position for the excitation light in a direction along said first optical path.

11. A laser device according to claim 6, wherein said third mirror is a concave mirror.

12. A laser device according to claim 7, wherein said third mirror is a concave mirror.

13. A laser device according to claim 7 further comprising a condensing optical element, disposed at a position interposing said second mirror between said laser medium and said condensing optical element, for condensing the excitation light into said laser medium, said condensing optical element being adjustable in its condensing position for the excitation light in a direction along said first optical path.

* * * * *